US012354784B2

(12) United States Patent
Yeo et al.

(10) Patent No.: US 12,354,784 B2
(45) Date of Patent: *Jul. 8, 2025

(54) COIL COMPONENT

(71) Applicant: SAMSUNG ELECTRO-MECHANICS CO., LTD., Suwon-si (KR)

(72) Inventors: Jeong Gu Yeo, Suwon-si (KR); Young Il Lee, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,172

(22) Filed: Jan. 10, 2023

(65) Prior Publication Data

US 2023/0162908 A1 May 25, 2023

Related U.S. Application Data

(63) Continuation of application No. 16/673,328, filed on Nov. 4, 2019, now Pat. No. 11,581,125.

(30) Foreign Application Priority Data

Jul. 3, 2019 (KR) ........................ 10-2019-0079989

(51) Int. Cl.
*H01F 27/28* (2006.01)
*H01F 27/02* (2006.01)
(Continued)

(52) U.S. Cl.
CPC ............. *H01F 27/29* (2013.01); *H01F 27/02* (2013.01); *H01F 27/255* (2013.01); *H01F 41/0246* (2013.01)

(58) Field of Classification Search
CPC ........ H01F 27/29; H01F 27/02; H01F 27/255; H01F 41/0246; H01F 1/26; H01F 3/14;
(Continued)

(56) References Cited

U.S. PATENT DOCUMENTS

2013/0169381 A1 7/2013 Kim et al.
2014/0001397 A1* 1/2014 Park ..................... H01F 41/046 252/62.54

(Continued)

FOREIGN PATENT DOCUMENTS

CN 104575935 A 4/2015
CN 108122662 A 6/2018

(Continued)

OTHER PUBLICATIONS

Office Action issued in corresponding Korean Patent Application No. 10-2019-0079989, dated Dec. 5, 2020, with English Translation.

(Continued)

*Primary Examiner* — Shawki S Ismail
*Assistant Examiner* — Kazi S Hossain
(74) *Attorney, Agent, or Firm* — MORGAN, LEWIS & BOCKIUS LLP

(57) ABSTRACT

A coil component includes a body having a molded portion and a cover portion disposed on one surface of the molded portion, and including magnetic metal powder; a winding coil disposed between one surface of the molded portion and the cover portion and embedded in the body, and including a coating layer surrounding a surface of each of a plurality of turns; and a first protective film disposed between the one surface of the molded portion and the cover portion and between at least a portion of the surface of the winding coil and the cover portion.

24 Claims, 6 Drawing Sheets

I - I'

(51) Int. Cl.

| | |
|---|---|
| ***H01F 27/255*** | (2006.01) |
| ***H01F 27/29*** | (2006.01) |
| ***H01F 41/02*** | (2006.01) |

(58) Field of Classification Search

CPC .. H01F 2017/048; H01F 17/04; H01F 27/292; H01F 27/324; H01F 27/2852; H01F 27/28; H01F 27/327; H01F 27/2823; H01B 7/24

USPC .......................................... 336/192, 200, 232

See application file for complete search history.

(56) References Cited

U.S. PATENT DOCUMENTS

| | | | | |
|---|---|---|---|---|
| 2014/0002227 | A1* | 1/2014 | Hsieh | H01F 5/003 336/200 |
| 2014/0132387 | A1 | 5/2014 | Shin | |
| 2014/0333401 | A1* | 11/2014 | Esaki | H01F 27/327 336/83 |
| 2015/0102889 | A1 | 4/2015 | Choi et al. | |
| 2016/0268040 | A1* | 9/2016 | Kim | H01F 17/0013 |
| 2018/0068775 | A1* | 3/2018 | Kwon | H01F 27/292 |
| 2018/0151285 | A1 | 5/2018 | Kwon et al. | |
| 2018/0308610 | A1* | 10/2018 | Ishida | H01F 27/292 |
| 2018/0308630 | A1 | 10/2018 | Shinohara et al. | |
| 2019/0180926 | A1 | 6/2019 | Kojima et al. | |
| 2020/0118733 | A1* | 4/2020 | Shimizu | H01F 27/2847 |

FOREIGN PATENT DOCUMENTS

| | | | |
|---|---|---|---|
| JP | 6090164 | B2 | 3/2017 |
| JP | 2018-182203 | A | 11/2018 |
| JP | 2019-106393 | A | 6/2019 |
| KR | 10-2013-0078110 | A | 7/2013 |
| KR | 10-2014-0061036 | A | 5/2014 |
| WO | 2018/235539 | A1 | 12/2018 |

OTHER PUBLICATIONS

Office Action issued in corresponding Korean Patent Application No. 10-2019-0079989 dated Jul. 1, 2020, with English translation.

Notice of Allowance issued in corresponding U.S. Appl. No. 16/673,328 dated Oct. 17, 2022.

Office Action issued in corresponding U.S. Appl. No. 16/673,328 dated Jun. 23, 2022.

Office Action dated Nov. 8, 2023 for counterpart Chinese Patent Application No. 202010040748.X (See Machine Translation).

* cited by examiner

1000'

I - I'

COIL COMPONENT

CROSS-REFERENCE TO RELATED APPLICATION(S)

This application is the continuation application of U.S. patent application Ser. No. 16/673,328 filed on Nov. 4, 2019, which claims benefit of priority to Korean Patent Application No. 10-2019-0079989 filed on Jul. 3, 2019 in the Korean Intellectual Property Office, the disclosures of which are incorporated herein by reference in their entirety.

BACKGROUND

The present disclosure relates to a coil component.

An example of a coil component is a wire-wound coil component using a magnetic mold and a wire-wound coil. In the case of the wire-wound coil component, a wire-wound coil in which a metal wire having a coating layer formed on a surface thereof is wound in a coil shape is used.

In forming a magnetic body covering the winding coil, the coating layer of the winding coil may be damaged by a magnetic powder contained in a material for forming the magnetic body. If the magnetic powder has conductivity, a short-circuit may occur between the winding coil and the magnetic body.

SUMMARY

An aspect of the present disclosure is to provide a coil component that can prevent a coating layer and a molded portion from being damaged due to pressure at the time of forming a body.

Another aspect of the present disclosure is to provide a coil component that can prevent a short-circuit between a body and a winding coil.

According to an aspect of the present disclosure, there is provided a coil component. The coil component includes a body having a molded portion and a cover portion disposed on one surface of the molded portion, and including magnetic metal powder; a winding coil disposed on one surface of the molded portion and the cover portion and embedded in the body, and including a coating layer surrounding a surface of each of a plurality of turns; and a first protective film disposed between the one surface of the molded portion and the cover portion and between at least a portion of the surface of the winding coil and the cover portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
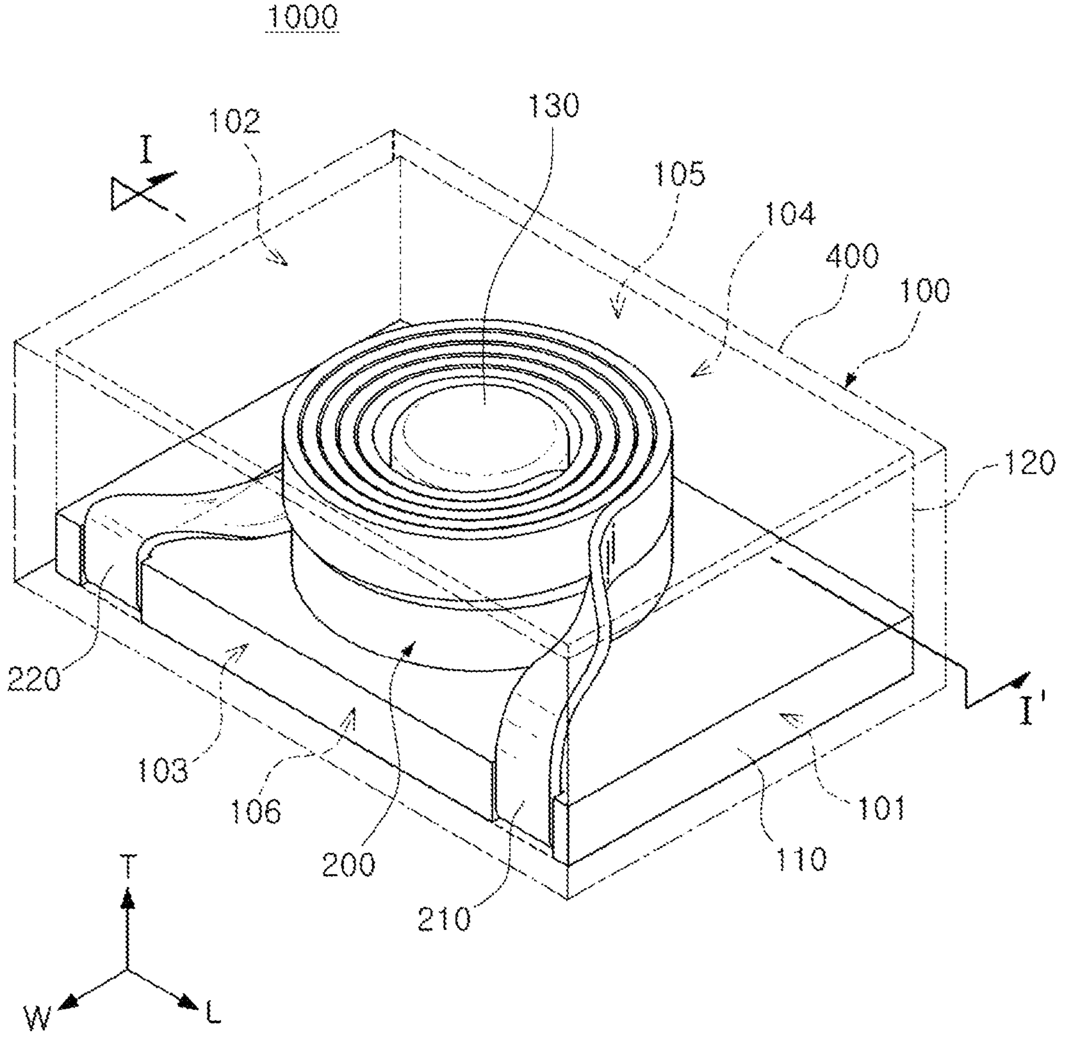
FIG. 1 is a schematic perspective view illustrating a coil component according to an embodiment of the present disclosure.

Hereinafter, embodiments of the present disclosure will be described as follows with reference to the attached drawings. The terms used in the exemplary embodiments are used to simply describe an exemplary embodiment, and are not intended to limit the present disclosure. A singular term includes a plural form unless otherwise indicated. The terms, “include,” “comprise,” “is configured to,” etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term “disposed on,” “positioned on,” and the like, may indicate that an element is positioned on or beneath an object, and does not necessarily mean that the element is positioned on the object with reference to a gravity direction.

The term “coupled to,” “combined to,” and the like, may not only indicate that elements are directly and physically in contact with each other, but also include the configuration in which the other element is interposed between the elements such that the elements are also in contact with the other component.

Sizes and thicknesses of elements illustrated in the drawings are indicated as examples for ease of description, and exemplary embodiments in the present disclosure are not limited thereto.

In the drawings, an L direction is a first direction or a length direction, a W direction is a second direction or a width direction, a T direction is a third direction or a thickness direction.

In the descriptions described with reference to the accompanied drawings, the same elements or elements corresponding to each other will be described using the same reference numerals, and overlapped descriptions will not be repeated.

Embodiment and a Modified Example

In electronic devices, various types of electronic components may be used, and various types of coil components may be used between the electronic components to remove noise, or the like.

In other words, in electronic devices, a coil component may be used as a power inductor, a high frequency (HF) inductor, a general bead, a high frequency (GHz) bead, a common mode filter, and the like.

Figure 2:
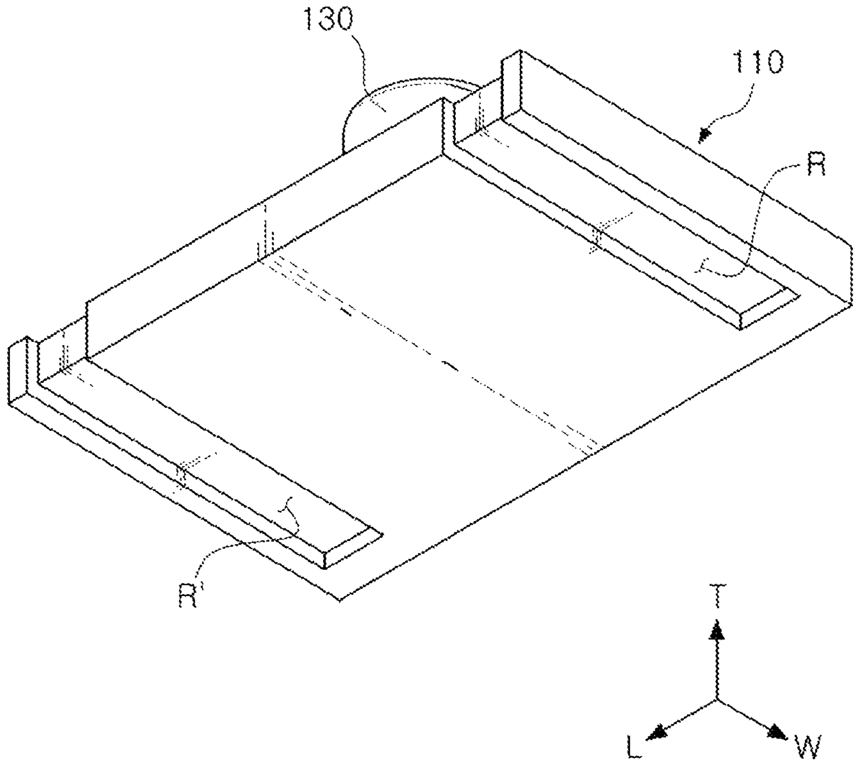
FIG. 2 is a schematic view illustrating the molded portion of FIG. 1.
Figure 3:
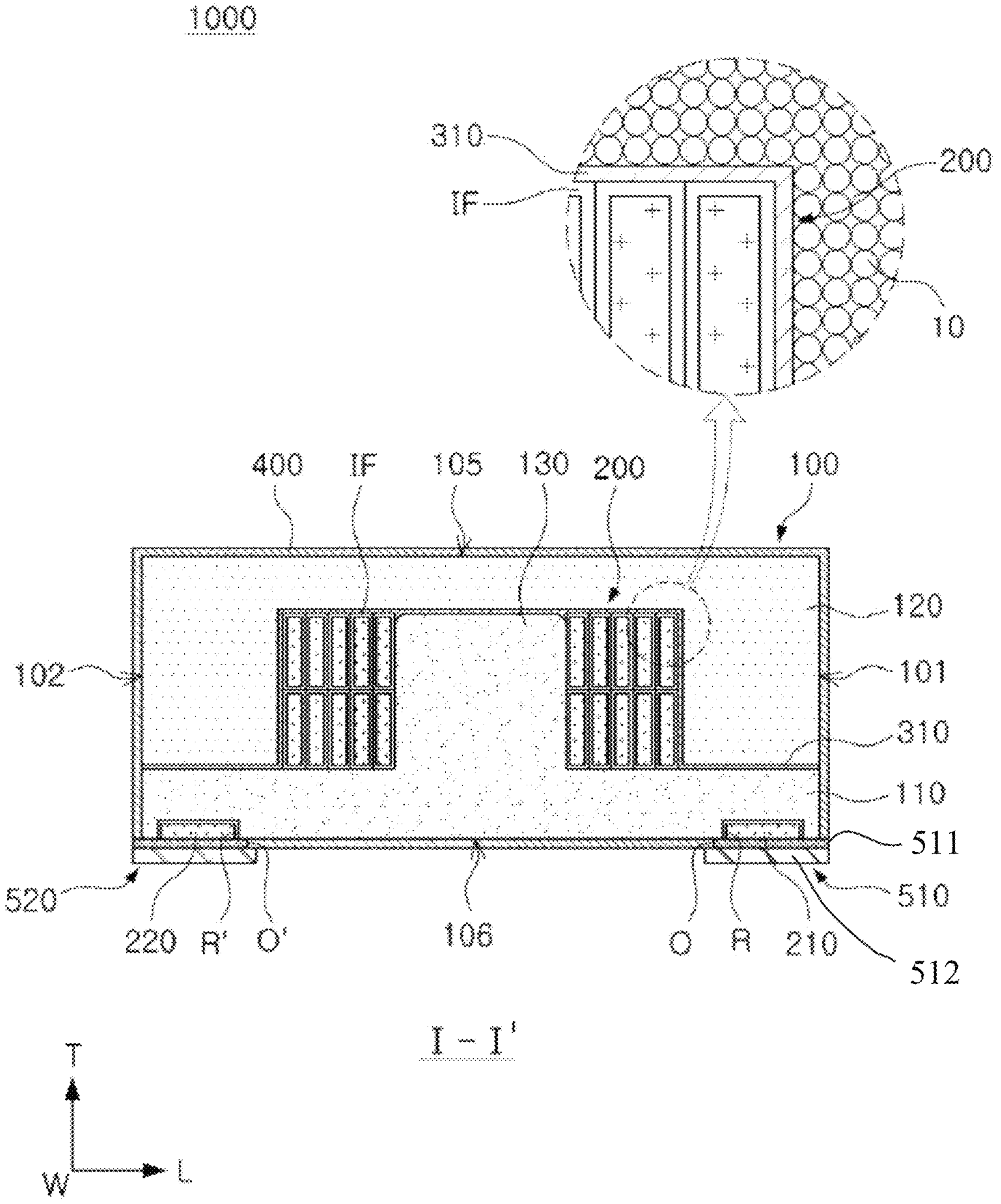
FIG. 3 is a view illustrating a cross-section taken along line I-I' of FIG. 1.

FIG. 1 is a schematic perspective view illustrating a coil component according to an embodiment of the present disclosure. FIG. 2 is a schematic view illustrating the molded portion of FIG. 1. FIG. 3 is a view illustrating a cross-section taken along line I-I' of FIG. 1.

Referring to FIGS. 1 to 3, a coil component 1000 according to an embodiment of the present disclosure may include a body 100, a winding coil 200, and a first protective film 310, and may include an insulating layer 400 and external electrodes 510 and 520.

The body 100 may form an exterior of the coil component 1000 according to the present embodiment, and may embed the winding coil 200 therein.

For example, the body 100 may have a hexahedral shape as a whole.

Referring to FIG. 1, the body 100 includes a first surface 101 and a second surface 102, opposing each other in a length direction L, a third surface 103 and a fourth surface 104, opposing each other in a width direction W, and a fifth surface 105 and a sixth surface 106, opposing each other in a thickness direction T. Each of the first to fourth surfaces 101, 102, 103, and 104 of the body 100 may correspond to a wall surface of the body 100 connecting the fifth surface 105 and the sixth surface 106 of the body 100. In the description below, both end surfaces of the body 100 may refer to the first surface 101 and the second surface 102 of the body, both side surfaces of the body 100 may refer to the third surface 103 and the fourth surface 104 of the body 100, and one surface and the other surface of the body 100 may refer to the sixth surface 106 and the fifth surface 105 of the body 100, respectively.

The body 100 may be formed such that the coil component 1000 according to the present embodiment in which external electrodes 510 and 520 to be described later is formed to have a length of 2.0 mm, a width of 1.2 mm, and a thickness of 0.65 mm, but is not limited thereto.

The body 100 may include a molded portion 110 and a cover portion 120 disposed on one surface of the molded portion 110, and may further include a core portion 130. Referring to FIGS. 1 and 3, side surfaces of the molded portion 110 and the cover portion 120 may constitute first to fifth surfaces 101, 102, 103, 104, and 105 of the body 100, and the other surface (a lower surface of the molded portion 110 based on directions of FIGS. 1 and 3) may constitute the sixth surface 106 of the body 100. Hereinafter, the other surface of the molded portion 110 may be the same as the sixth surface of the body 100.

The molded portion 110 has one surface and the other surface facing each other. The molded portion 110 supports a winding coil 200 to be described later, disposed on one surface of the molded portion 110. A core portion 130 may protrude from one surface of the molded portion 110, and the core portion 130 may be disposed at a central portion of one surface of the molded portion 110 to penetrate through the winding coil 200.

The cover portion 120 covers the winding coil 200 to be described later together with the molded portion 110. The cover portion 120 may be disposed on the molded portion 110 and the winding coil 200 and then pressed to be coupled to the molded portion 110.

The body 100 includes a magnetic material. That is, at least one of the molded portion 110, the cover portion 120, or the core portion 130 includes a magnetic material. Hereinafter, although it will be described as a configuration that the molded portion 110, the cover portion 120, and the core portion 130 all include a magnetic material, but the scope of the present disclosure is not limited thereto.

As an example, the molded portion 110 may be formed by filling a magnetic material into a mold for forming the molded portion 110. As another example, the molded portion 110 may be formed by filling a composite material including a magnetic material and an insulating resin in a mold. A process of applying a high-temperature and a high-pressure to the magnetic material or the composite material in the mold may be additionally performed, but the present disclosure is not limited thereto. The molded portion 110, as a base from which the core portion 130 extends, and the core portion 130 may be integrally formed by the above-described mold and thus a boundary therebetween may not be formed. The cover portion 120 may be formed by disposing a magnetic composite sheet in which a magnetic material is dispersed in an insulating resin on the molded portion 110 and the winding coil 200, followed by heating and pressing.

The magnetic material may be ferrite or magnetic metal powder 10.

The ferrite powder may include, for example, at least one or more materials among a spinel ferrite such as an Mg—Zn ferrite, an Mn—Zn ferrite, an Mn—Mg ferrite, a Cu—Zn ferrite, an Mg—Mn—Sr ferrite, an Ni—Zn ferrite, and the like, a hexagonal ferrite such as a Ba—Zn ferrite, a Ba—Mg ferrite, a Ba—Ni ferrite, a Ba—Co ferrite, a Ba—Ni—Co ferrite, and the like, a garnet ferrite such as a Y ferrite, and a Li ferrite.

The magnetic metal powder 10 may include one or more elements selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder may be at least one or more among a pure iron powder, a Fe—Si alloy powder, a Fe—Si—Al alloy powder, a Fe—Ni alloy powder, a Fe—Ni—Mo alloy powder, a Fe—Ni—Mo—Cu alloy powder, a Fe—Co alloy powder, a Fe—Ni—Co alloy powder, a Fe—Cr alloy powder, a Fe—Cr—Si alloy powder, a Fe—Si—Cu—Nb alloy powder, a Fe—Ni—Cr alloy powder, and a Fe—Cr—Al alloy powder.

Hereinafter, a case in which the magnetic material is the magnetic metal powder 10 will be described, but the scope of the present disclosure is not limited thereto as described above.

The magnetic metal powder 10 may be amorphous or crystalline. For example, the magnetic metal powder 10 may be a Fe—Si—B—Cr amorphous alloy powder, but is not necessarily limited thereto. The magnetic metal powder 10 may have an average diameter of about 0.1 μm to 30 μm, but is not limited thereto. Although not shown, an insulating film may be formed on the surface of the magnetic metal powder 10. The insulating film may include epoxy, polyimide, a liquid crystal polymer, or the like, alone or in combination thereof, but is not limited thereto.

At least one of the molded portion 110, the cover portion 120, or the core portion 130 may include two or more magnetic metal powder 10. Here, the fact that the magnetic metal powder 10 has different types means that the magnetic metal powder 10 is distinguished from any one of an average diameter, a composition, crystallinity, and a form.

The insulating resin may be include an epoxy, a polyimide, a liquid crystal polymer, or the like, alone or in combination thereof, but is not limited thereto.

The winding coil 200 exhibits characteristics of the coil component 1000. For example, when the coil component 1000 of the present embodiment is used as a power inductor, the winding coil 200 may serve to stabilize power supply of an electronic device by storing an electric field as a magnetic field and maintaining an output voltage.

The winding coil 200 is embedded in the body 100. Specifically, the winding coil 200 is disposed between one surface of the molded portion 110 and the cover portion 120 such that the winding coil 200 is embedded in the body 100. The winding coil 200 is an air core coil, and when the core portion 130 is formed in the molded portion 110, the core portion 130 is disposed in the air core of the winding coil 200. When the core portion 130 is not formed in the molded portion 110, a magnetic composite sheet for forming the cover portion 120 may fill the air core of the winding coil 200.

The winding coil 200 includes a coating layer IF surrounding the surface of each of a plurality of turns. The winding coil 200 forms an innermost turn, at least one middle turn, and an outermost turn, in a direction outward of a central portion of one surface of the molded portion 110. The winding coil 200 is formed by spirally winding a metal wire such as a copper wire (Cu-wire) in which a surface thereof is coated with the coating layer IF. Therefore, the coating layer IF surrounds the surface of each turn of the winding coil 200. In addition, the winding coil 200 has an upper surface and a lower surface similar to a ring shape as a whole, and an inner side surface and an outer side surface connecting the upper surface and the lower surface. The coating layer IF may include an epoxy, a polyimide, a liquid crystal polymer, or the like, alone or in combination thereof, but is not limited thereto.

The lead-out portions 210 and 220 are exposed on the other surface of the molded portion 110, respectively, to be spaced apart from each other, as both end portions of the winding coil 200. The lead-out portions 210 and 220 may have a shape extending along a width direction W from the other surface of the molded portion 110. The lead-out portions 210 and 220 may be disposed to be spaced apart from each other along a length direction L of the body 100 from the other surface 106 of the molded portion 110. The lead-out portions 210 and 220 may remain after the winding coil 200 is formed of a metal wire such as a copper wire, and the surfaces thereof are coated with a coating layer IF. As a result, a boundary between the lead-out portions 210 and 220 and the winding coil 200 may not be formed. In addition, like the winding coil 200, a coating layer IF is formed on the surface of the lead-out portions 210 and 220. Meanwhile, a portion of the coating layers IF of the lead-out portions 210 and 220 may be removed for connection between the lead-out portions 210 and 220 and external electrodes 510 and 502 to be described later.

The lead-out portions 210 and 220 are exposed to the sixth surface 106 of the body 100. As an example, as illustrated in FIGS. 2 and 3, grooves R and R' are formed along a side surface of the molded portion 110 and the other surface of the molded portion 110 in the molded portion 100, and the lead-out portions 210 and 220 are disposed in the grooves R and R', respectively. The grooves R and R' are formed in a shape corresponding to the lead-out portions 210 and 220. Meanwhile, the grooves R and R' are formed in a process of forming the molded portion 110 with a mold or may be formed in the molded portion 110 in a process of pressing the cover portion 120. As another example, the lead-out portions 210 and 220 may penetrate through the molded portion 110 and exposed to the other surface of the molded portion 110.

A first protective film 310 prevents the coating layer IF of the winding coil 200 from being damaged by the magnetic metal powder 10 when the cover portion 130 is formed, and as a result, the first protective film 310 prevents a short-circuit between the winding coil 200 and the body 100. Further, the first protective film 310 may prevent the molded portion 110 from being damaged by the magnetic metal powder when the cover portion 130 is formed.

The first protective film 310 may be a ceramic material including at least one of alumina ($Al_2O_3$) or silica ($SiO_2$). When the first protective film 310 is formed of a polymer material, strength of the first protective film 310 may be lower than that of the first protective film 310 of the ceramic material due to characteristics of the material. Therefore, in the present embodiment, the first protective film 310 is formed of a ceramic material, and even if pressure is applied when the cover portion 130 is formed, damages to the coating layer IF and the molded portion 110 may be more reliably prevented. In addition, since higher pressure may be applied when the cover portion 130 is formed, it is possible to improve a charging rate of a magnetic material of the body 100.

The first protective film 310 is disposed between one surface of the molded portion 110 and the cover portion 120 and between at least a portion of the surface of the winding coil 200 and the cover portion 120. The first protective film 310 is formed by disposing the winding coil 200 on one surface of the molded portion 110, and then forming the first protective film 310 in the molded portion 110. After the first protective film 310 is formed, a cover portion 120 is formed. Therefore, the first protective film 310 is disposed between one surface of the molded portion 110 and the cover portion 120. In addition, the first protective film 310 is disposed at least a portion of the surface of the winding coil 200 and the cover portion 120. More specifically, the first protective film 310 is disposed between an upper surface of the winding coil 200 and the cover portion 120, and is disposed between an outer side surface of the winding coil 200 and the cover portion 120. When a core portion 130 is formed together with the molded portion 110, the first protective film 310 is disposed between the core portion 130 and the cover portion 120 and extends between the core portion 130 and the cover portion 120. Meanwhile, when a spaced space is formed between the inner side surface of the winding coil 200 and the core portion 130, the first protective film 310 may be disposed in the space. In a case in which the core portion 130 extends above the winding coil 200 (e.g., an upper surface of the core portion 130 is above an upper surface of the winding coil 200), the first protective film 310 may extend to cover portions of side surfaces of the core portion 130 above the winding coil 200. In a case in which the core portion 130 is below the winding coil 200 (e.g., an upper surface of the core portion 130 is below an upper surface of the winding coil 200), the first protective film 310 may extend to cover portions of inner side surfaces of the winding coil 200 above the core portion 130.

The first protective film 310 may be formed by laminating a film for forming a first protective film or the like on the molded portion 110 on which the winding coil 200 is disposed or may be formed by depositing a material for constituting the first protective film 310 to the molded portion 110 on which the winding coil 200 is disposed by using a vapor deposition method such as sputtering or an atomic layer deposition (ALD), or the like. When the first protective film 310 is formed by vapor deposition such as sputtering or the like, the first protective film 310 may be formed in a form of a conformal film along one surface of the molded portion 110 on which the winding coil 200 is disposed. That is, one surface of the molded portion includes a first region on which the winding coil 200 is disposed and a second region on which the winding coil 200 is not disposed, outside of the first region. The first protective film 310 may be formed in a relatively uniform and thin thickness along the second region of one surface of the molded portion 110, the outer side surface of the winding coil 200, and the surface of the upper surface of the winding coil 200.

The first protective film 310 is exposed to a side surface of the body 100, and the exposed surface of the first protective film 310 is disposed substantially in the same plane as the side surface of the body 100. As an example, as illustrated in FIG. 3, the first protective film 310 is exposed to first and second surfaces 101 and 102 of the body 100. The first protective film 310 is disposed substantially in the same plane as the first and second surfaces 101 and 102 of the body 100 formed by the side surface of the molded portion 110 and the side surface of the cover portion 120, respectively. The first protective film 310 is formed on an entire outer portion of one surface of the molded portion 100 on which the winding coil 200 is not disposed. Therefore, as an example, the exposed surface of the first protective film 310 is formed in a form extending to both end portions of the first surface 101 of the body 100 in the width direction W, with respect to the first surface 101 of the body 100. As a result, with reference to the first surface 101 of the body 100, the exposed surface of the first protective film 310 separates the side surface of the molded portion 100 and the side surface of the cover portion 120 from each other. Meanwhile, the above-description is applied equally to the second surface 102 and the fourth surface 104 of the body 100, and the above-description is also applied equally to the third surface 103 not including portions in which the grooves R and R' are formed.

An insulating layer 400 surrounds the first to sixth surfaces 101, 102, 103, 104, 105, and 106 of the body 100. Openings O and O' respectively expose portions of the lead-out portions 210 and 220. The external electrodes 510 and 520 are formed in the openings O and O' of the insulating layer 400. The insulating layer 400 disposed on each of the first to sixth surfaces 101, 102, 103, 104, 105, and 106 may be formed in the same process and the same material, so a boundary therebetween may not be formed, but the present disclosure is not limited thereto. In another example, the insulating layer 400 formed on the first to fourth surfaces 101, 102, 103, and 104 of the body 100 and the insulating layer 400 formed on the sixth surface 106 of the body 100 may be formed in different processes, so a boundary therebetween may be formed.

The insulating layer 400 may be formed by printing an insulating paste on the first to sixth surfaces 101, 102, 103, 104, 105, and 106 of the body 100, applying an insulating resin, or laminating an insulating film including the insulating resin. The insulating resin may include epoxy, polyimide, a liquid crystal polymer, or the like along in mixture thereof, but is not limited thereto.

Openings O and O' are disposed in the insulating layer 400 to expose a portion of the lead-out portions 210 and 220. As described above, since the lead-out portions 210 and 220 are disposed on the sixth surface 106 of the body 100 to be spaced apart from each other, the openings O and O' may be formed in a shape extending in a width direction W of the body 100 in a region disposed on the sixth surface 106 of the body 100 of the insulating layer 400. External electrodes 510 and 520 to be described later are disposed in the openings O and O', and the external electrodes 510 and 520 and the lead-out portions 210 and 220 are connected to each other. The openings O and O' may be formed by removing a portion of the insulating layer 400 to expose a portion of each of the lead-out portions 210 and 220 disposed on the sixth surface 106 of the body 100.

The openings O and O' may be formed in the insulating layer 400 by a process such as mechanical polishing, laser or sandblasting. It is not easy to selectively remove only a portion of regions in both end portions of the insulating layer 400 in the width direction W by mechanical polishing. Laser or sandblasting can be used to selectively remove only a portion of regions in both end portions in the width direction W of the insulating layer 400.

The external electrodes 510 and 520 are disposed in the openings O and O' and connected to the lead-out portions 210 and 220. The external electrodes 510 and 520 are exposed from the insulating layer 400. Specifically, the first external electrode 510 is disposed in the opening O and connected to the first lead-out portion 210, and the second external electrode 520 is disposed in the opening O' and connected to the second lead-out portion 220. The first and second external electrodes 510 and 520 are disposed to be spaced apart from each other on the sixth surface 106 of the body 100.

The external electrodes 510 and 520 may be formed of a conductive material such as copper (Cu), aluminum (Al), silver (Ag), tin (Sn), gold (Au), nickel (Ni), lead (Pb), chromium (Cr), titanium (Ti), or alloys thereof, but an example of the material is not limited thereto.

The first and second external electrodes 510 and 520 may be formed as a single layer or a plurality of layers. As an example, the first external electrode 510 may be comprised of a first layer 511 including copper (Cu), a second layer 512 disposed on the first layer 511 and including nickel (Ni), and a third layer disposed on the second layer and including tin (Si). Each of the first to third layers may be formed by electroplating, but is not limited thereto. Each of the first and second external electrodes 510 and 520 may include a conductive resin layer and an electroplating layer. The conductive resin layer may be formed by applying and curing conductive powder including silver (Ag) and/or copper (Cu) and a conductive paste including an insulating resin such as epoxy.

At least a portion of the external electrodes 510 and 520 may extend onto the insulating layer 400. As an example, when the external electrodes 510 and 520 include a conductive resin layer and an electroplating layer, the conductive resin layer may be formed to fill at least a portion of the openings O and O', and then the electroplating layer may be formed on the conductive resin layer. In this case, the electroplating layer may be formed on the insulating layer 400 after filling a remaining volume of the openings O and O' due to plating spread. When at least a portion of the external electrodes 510 and 520 extends and is formed on the insulating layer 400, exposed areas of the external electrodes 510 and 520 may be increased, such that a coupling force with a solder, or the like during mounting may be increased.

Figure 4:
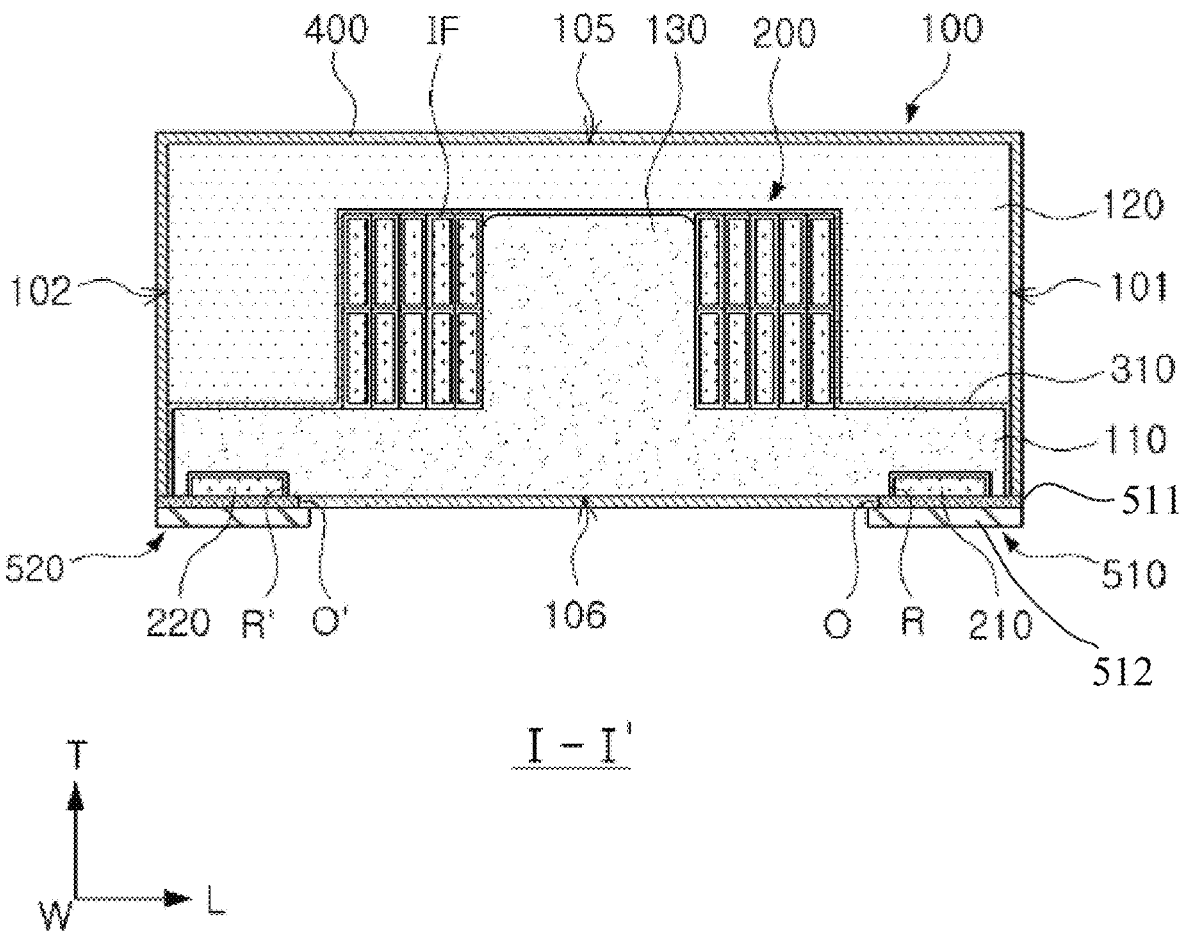
FIG. 4 is a schematic view illustrating a modified example of a coil component according to an embodiment of the present disclosure, and is a view corresponding to the cross-section taken along line I-I' of FIG. 1.

FIG. 4 is a view schematically illustrating a modified example of a coil component according to an embodiment of the present disclosure, and a view corresponding to a cross-section taken along line I-I' of FIG. 1.

Referring to FIG. 4, in the case of a coil component 1000' according to a present modified example, a first protective film 310 may be extended and disposed on a side surface of a molded portion 110 connected to one surface of the molded portion 110. Since the first protective film 310 is also disposed on the side surface of the molded portion 110, the side surface of the molded portion 110 may be prevented from being damaged by pressure applied to the side surface of the molded portion 110 when the cover portion 120 is formed.

Another Embodiment and Modified Example

Figure 5:
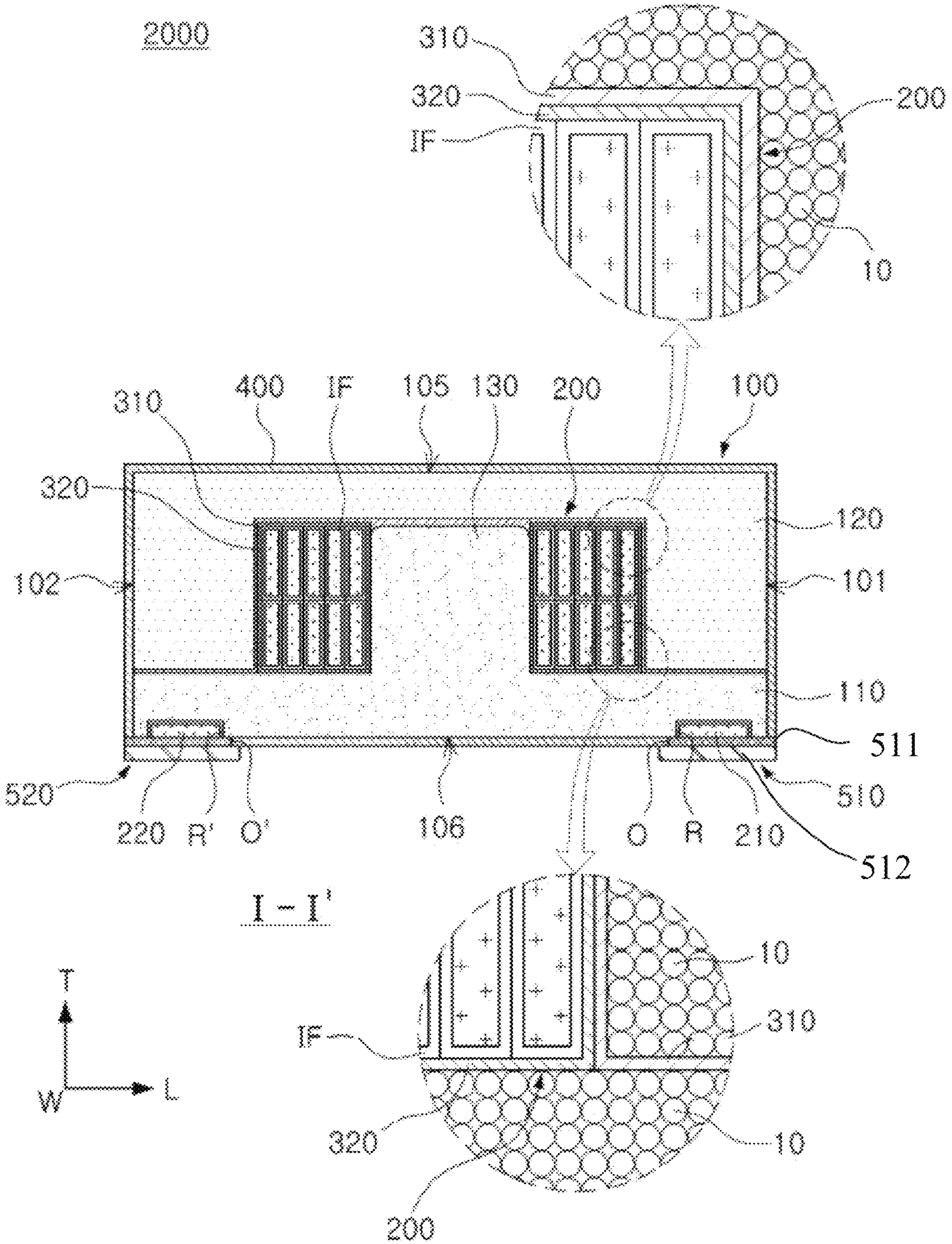
FIG. 5 is a schematic view illustrating a coil component according to another embodiment of the present disclosure, and is a view corresponding to the cross-section taken along line I-I' of FIG. 1.
Figure 6:
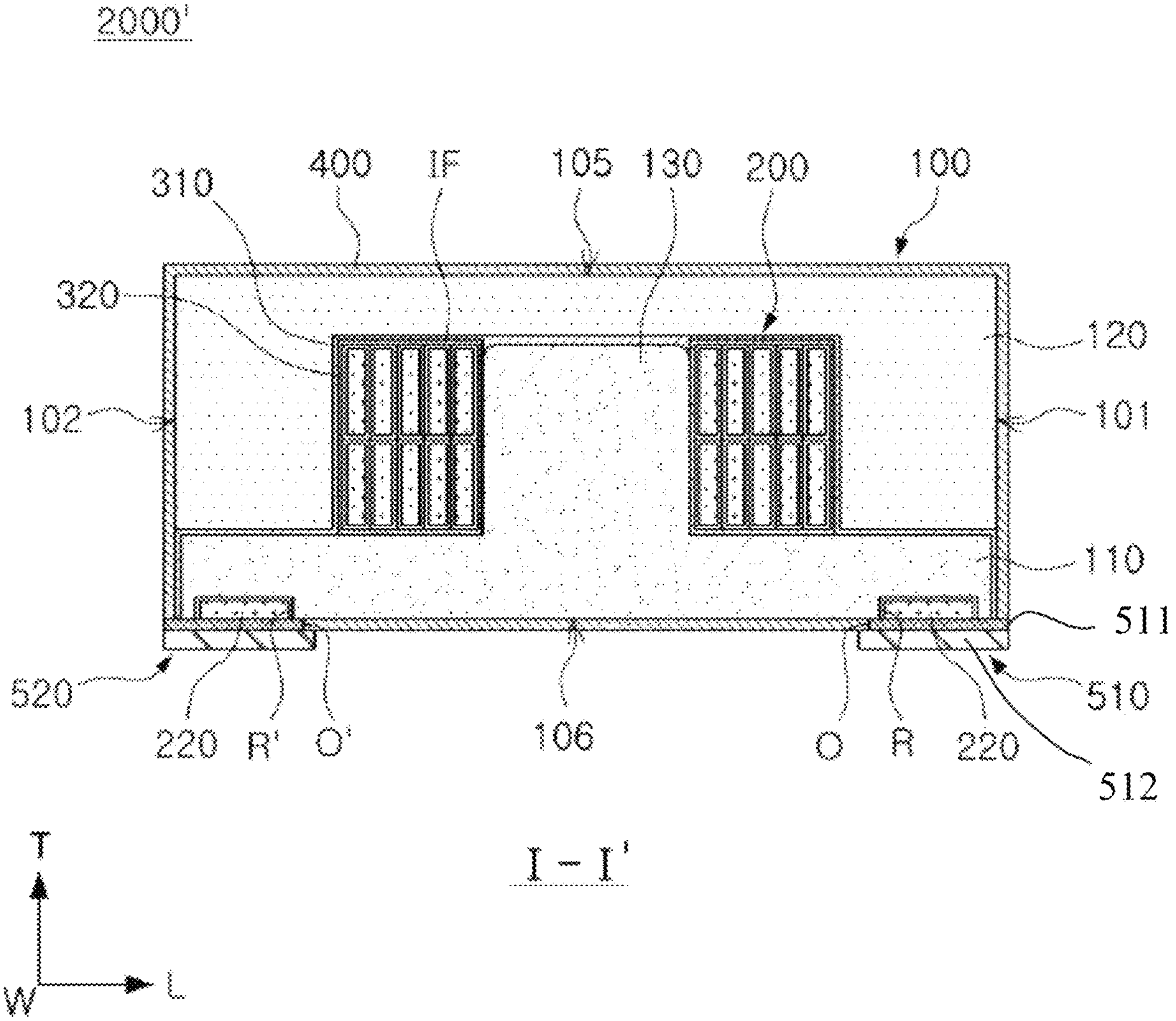
FIG. 6 is a schematic view illustrating a modified example of a coil component according to another embodiment of the present disclosure, and is a view corresponding to the cross-section taken along line I-I' of FIG. 1.

FIG. 5 is a view schematically illustrating a coil component according to another embodiment of the present disclosure, and is a view corresponding to a cross-section taken along line I-I'. FIG. 6 is a view schematically illustrating a modified example of a coil component according to another embodiment of the present disclosure, and is a view corresponding to a cross-section taken along line I-I' of FIG. 1.

Referring to FIGS. 1 to 4 and FIGS. 5 to 6, coil components 2000 and 2000' according to the present embodiment and the modified example of the present embodiment may further include a second protective film 320 as compared with the coil components 1000 and 1000' according to an embodiment and a modified example of an embodiment of the present disclosure. Therefore, in describing the present embodiment and the modified example of the present embodiment, only the second protective film 320, which is different from an embodiment and the modified example of an embodiment of the present disclosure will be described. In the remaining configuration of the present embodiment and the modified example of the present embodiment, description in an embodiment and the modified example of an embodiment of the present disclosure may be applied as it is.

Referring to FIG. 5, a coil component 2000 according to another embodiment of the present disclosure may further include a second protective film 320 disposed between the first protective film 310 and the winding coil 200 and between the winding coil 200 and the molded portion 110 to cover a surface of the winding coil 200.

The second protective film 320 covers the surface of the winding coil 200. In the present embodiment, before the winding coil 200 is disposed on one surface of the molded portion 110, the second protective film 320 surrounding the surface of the winding coil 200 is formed, and the winding coil 200 on which the second protective film 320 is formed is disposed on the molded portion 110, and a first protective film 310 is formed on the molded portion 110 on which the winding coil 200 is disposed. Therefore, the second protective film 320 is formed to surround both upper and lower surfaces, and inner side surfaces and outer side surfaces of the winding coil 200. The winding coil 200 is disposed on a first region of the molded portion 110. The first protective film 310 is disposed on a second region of the molded portion 110 surrounding the first region, and is disposed on the outer side surface and the upper surface of the winding coil 200 on which the second protective film 320 is formed.

The second protective film 320 may be a ceramic material including at least one of alumina ($Al_2O_3$) or silica ($SiO_2$). When the second protective film 320 is formed of a polymer material, strength of the second protective film 320 may be weaker than that of the second protective film 320 made of a ceramic material due to characteristics of materials. Therefore, in the present embodiment, by forming the second protective film 320 made of a ceramic material, damage to the coating layer IF and the molded portion 110 may be more reliability prevented even when pressure is applied to form the cover portion 130. In addition, when the cover portion 130 is formed, since high pressure may be applied, a filling rate of a magnetic material of the body 100 may be improved.

In the present embodiment, unlike an embodiment of the present disclosure, the second protective film 320 is interposed between one surface of the molded portion 110 and a lower surface of the winding coil 200, facing one surface of the molded portion 110. As a result, when the cover portion 120 is formed, the coating layer IF of the winding coil 200 may be prevented from being damaged by pressure applied to the lower surface of the winding coil 200 from one surface of the molded portion 110. That is, the coating layer IF at the lower surface side of the winding coil 200 may be prevented from being damaged by the magnetic metal powder particle 10 of the molded portion 110.

Referring to FIG. 6, in the case of the coil component 2000' according to a modified example of the present embodiment, the first protective film 310 extend to the side surface of the molded portion 110. Since it was described in the coil component 1000' according to an embodiment and a modified example of the present disclosure, the description thereof will be omitted.

As set forth above, according to the present disclosure, it is possible to prevent the coating layer and the molded portion of the winding coil from being damaged when pressure at the time of forming the body is applied.

According to the present disclosure, it is possible to prevent a short-circuit between the body and the winding coil.

While the exemplary embodiments have been shown and described above, it will be apparent to those skilled in the art that modifications and variations could be made without departing from the scope of the present invention as defined by the appended claims.

What is claimed is:

1. A coil component, comprising:

a body including magnetic metal powder, and having a molded portion and a cover portion with a recess in which a portion of the molded portion is disposed;

a winding coil disposed in the body and wound around a winding axis;

first and second external electrodes connecting with the winding coil; and a layer disposed between the cover portion and the molded portion, wherein end portions of the layer extend in a direction of the winding axis to be exposed ona surface of the molded portion, on which the first and second external electrodes are disposed, to contact the first and second external electrodes, respectively.

2. The coil component of claim 1, wherein one of the first and second external electrodes includes a first layer and a second layer.

3. The coil component of claim 2, wherein each of the first layer and the second layer includes silver (Ag).

4. The coil component of claim 2, wherein the first layer includes at least one of copper (Cu), aluminum (Al), silver (Ag), tin (Sn), gold (Au), nickel (Ni), lead (Pb), chromium (Cr), titanium (Ti), and alloys thereof.

5. The coil component of claim 1, wherein the magnetic metal powder having a composition comprising at least one of Fe-Si, Fe-Cr-Si, and Fe-Cr-Al.

6. The coil component of claim 5, wherein the body further includes a core portion disposed in an air core of the winding coil, and the core portion includes an amorphous magnetic metal powder.

7. The coil component of claim 6, wherein the amorphous metal magnetic powder has an average diameter of at least 0.1 μm and at most 30 μm.

8. The coil component of claim 1, wherein the winding coil includes a lead-out portion, and the lead-out portion is spaced apart from the layer.

9. The coil component of claim 1, wherein one of the first and second external electrodes comprises a plurality of layers.

10. The coil component of claim 1, wherein the layer is disposed along the recess.

11. The coil component of claim 1, wherein the layer comprises at least one of alumina ($Al_2O_3$) or silica ($SiO_2$).

12. The coil component of claim 1, wherein the exposed surface of the layer is disposed on a plane substantially the same as the surface of the body.

13. The coil component of claim 1, wherein first and second lead-out portions of the winding coil are exposed on the surface of the molded portion to be spaced apart from each other, and the surface of the molded portion has groove portions corresponding to the first and second lead-out portions of the winding coil.

14. The coil component of claim 13, wherein the first and second external electrodes are connected to the first and second lead-out portions of the winding coil, respectively, and the coil component further comprises an insulating layer surrounding surfaces of the body and having openings exposing the first and second external electrodes formed therein.

15. A coil component, comprising:

a body including magnetic metal powder, and having a molded portion and a cover portion with a recess in which a portion of the molded portion is disposed;

a winding coil disposed in the body, and including a lead-out portion spaced apart from all outer side surfaces of the cover portion; and first and second external electrodes connecting with the winding coil, wherein side surfaces of the molded portion, disposed in the body, extend to a surface of the body on which the first and second external electrodes are disposed, and are connected with the first and second external electrodes, respectively.

16. The coil component of claim 15, wherein one of the first and second external electrodes includes a first layer and a second layer.

17. The coil component of claim 16, wherein each of the first layer and the second layer includes silver (Ag).

18. The coil component of claim 16, wherein the first layer includes at least one of copper (Cu), aluminum (Al), silver (Ag), tin (Sn), gold (Au), nickel (Ni), lead (Pb), chromium (Cr), titanium (Ti), and alloys thereof.

19. The coil component of claim 15, wherein the magnetic metal powder having a composition comprising at least one of Fe-Si, Fe-Cr-Si, and Fe-Cr-Al.

20. The coil component of claim 19, wherein the body further includes a core portion disposed in an air core of the winding coil, and the core portion includes an amorphous magnetic metal powder.

21. The coil component of claim 20, wherein the amorphous metal magnetic powder has an average diameter of at least 0.1 μm and at most 30 μm.

22. The coil component of claim 15, wherein one of the first and second external electrodes comprises a plurality of layers.

23. The coil component of claim 15, wherein the lead-out portion of the winding coil is exposed on the surface of the molded portion, and the surface of the molded portion has groove portion corresponding to the lead-out portion of the winding coil.

24. The coil component of claim 23, wherein the coil component further comprises an insulating layer surrounding surfaces of the body and having openings exposing the first and second external electrodes formed therein.

* * * * *